(12) United States Patent
Shaheen et al.

(10) Patent No.: US 7,120,460 B2
(45) Date of Patent: *Oct. 10, 2006

(54) METHOD AND APPARATUS FOR HANDOFF BETWEEN A WIRELESS LOCAL AREA NETWORK (WLAN) AND A UNIVERSAL MOBILE TELECOMMUNICATION SYSTEM (UMTS)

(75) Inventors: Kamel M. Shaheen, King of Prussia, PA (US); Brian G. Kiernan, Voorhees, NJ (US)

(73) Assignee: InterDigital Technology Corporation, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/111,569

(22) Filed: Apr. 21, 2005

(65) Prior Publication Data

US 2005/0192009 A1 Sep. 1, 2005

Related U.S. Application Data

(63) Continuation of application No. 10/294,065, filed on Nov. 14, 2002, now Pat. No. 7,047,036.

(60) Provisional application No. 60/393,413, filed on Jul. 2, 2002.

(51) Int. Cl.
 *H04Q 7/20* (2006.01)
(52) U.S. Cl. ............... 455/552.1; 455/436; 455/445
(58) Field of Classification Search ............ 455/127.4, 455/168.1, 436–439, 444, 454, 422.1, 62, 455/426.1, 552.1, 553.1; 370/252, 320, 338, 370/328, 412, 470, 466; 709/205, 235, 227
See application file for complete search history.

(56) References Cited

U.S. PATENT DOCUMENTS

| | | | |
|---|---|---|---|
| 5,787,347 | A | 7/1998 | Yu et al. |
| 5,999,816 | A | 12/1999 | Tiedemann et al. |
| 6,061,565 | A | 5/2000 | Innes et al. |
| 6,112,093 | A | 8/2000 | Nordlund |
| 6,115,608 | A | 9/2000 | Duran et al. |
| 6,128,490 | A | 10/2000 | Shaheen et al. |
| 6,201,968 | B1 | 3/2001 | Ostroff et al. |
| 6,353,602 | B1 | 3/2002 | Cheng et al. |
| 6,546,246 | B1 | 4/2003 | Bridges et al. |

(Continued)

FOREIGN PATENT DOCUMENTS

WO  01/31963  5/2001

OTHER PUBLICATIONS

3GPP TSG CN #9, Hawaii, USA, Sep. 20-22, 2000, Tdoc 3GPP NP-000451.

(Continued)

*Primary Examiner*—Jean Gelin
(74) *Attorney, Agent, or Firm*—Volpe and Koenig, P.C.

(57) ABSTRACT

Apparatus and method for providing an automatic handoff process of a dual-mods user equipment (UE) from either a wireless local area network (WLAN) to a universal mobile telecommunications system (UMTS) or from a UMTS to a WLAN. Handoffs may be initiated by the UE, based upon user preference, signal quality, comparison of location coordinates of the UE and the system to be switched to or signal quality. The available channels of one system may be sent to the UE by the other system or the UE may monitor channels of the system to be switched to and lock on to one. The handoff may also be initiated by the UMTS, the selection being power-based.

9 Claims, 7 Drawing Sheets

U.S. PATENT DOCUMENTS

| | | |
|---|---|---|
| 2002/0024937 A1 | 2/2002 | Barnard et al. |
| 2002/0032034 A1 | 3/2002 | Tiedemann et al. |
| 2003/0100307 A1 | 5/2003 | Wolochow et al. |
| 2003/0148786 A1 | 8/2003 | Cooper et al. |
| 2004/0063426 A1 | 4/2004 | Hunkeler |
| 2004/0100913 A1 | 5/2004 | Kalliokuliu et al. |

OTHER PUBLICATIONS

3GPP TSG CN #9, Hawaii, USA, Sep. 20-22, 2000, Tdoc 3GPP NP-000451.

METHOD AND APPARATUS FOR HANDOFF BETWEEN A WIRELESS LOCAL AREA NETWORK (WLAN) AND A UNIVERSAL MOBILE TELECOMMUNICATION SYSTEM (UMTS)

CROSS REFERENCE TO RELATED APPLICATIONS

This application claims priority from U.S. Provisional Application Ser. No. 60/393,413, filed Jul. 2, 2002 and U.S. Nonprovisional application Ser. No. 10/294,065, filed Nov. 14, 2002 now U.S. Pat. No. 7,047,036 which is incorporated by reference as if fully set forth.

BACKGROUND

The present invention relates to WLAN and UMTS systems. More particularly, the present invention relates to apparatus and techniques for automatic handoff between WLAN and UMTS Systems.

The triggering of a handoff process between a UMTS System and a WLAN System can be performed by a manual handoff process initiated by the user wherein the user knows the existence of the WLAN coverage in the current geographic location and switches "on" its WLAN connection.

Nevertheless, it is extremely desirous to provide an automatic handoff process.

SUMMARY

The present invention is characterized by providing automatic handoff techniques which may be either UE-initiated or system-initiated.

Regarding-UE initiated techniques, the UE detects the existence of a WLAN footprint and initiates the handoff (HO) process based on a user preference. Alternatively, the UE may track the locations of WLAN coverage areas and initiate the HO process within a specific range from the WLAN.

System initiated techniques include the following:

Power measurements requested from the UE by the system which include a set of all WLAN frequencies. The system initiates the HO procedures based on a set of criteria which includes the mobility of the UE and the desired applications, when the UE is within the WLAN coverage area.

As another embodiment, the system tracks the UE location and initiates the HO procedures based on a set of criteria, including mobility of the UE and the requested applications, when the UE is within the WLAN coverage area.

BRIEF DESCRIPTION OF THE DRAWING(S)

The present invention will be understood from consideration of the detailed description and drawings wherein like elements are designated by like numerals, and wherein.

DETAILED DESCRIPTION OF THE PREFERRED EMBODIMENT(S)

Figure 1:
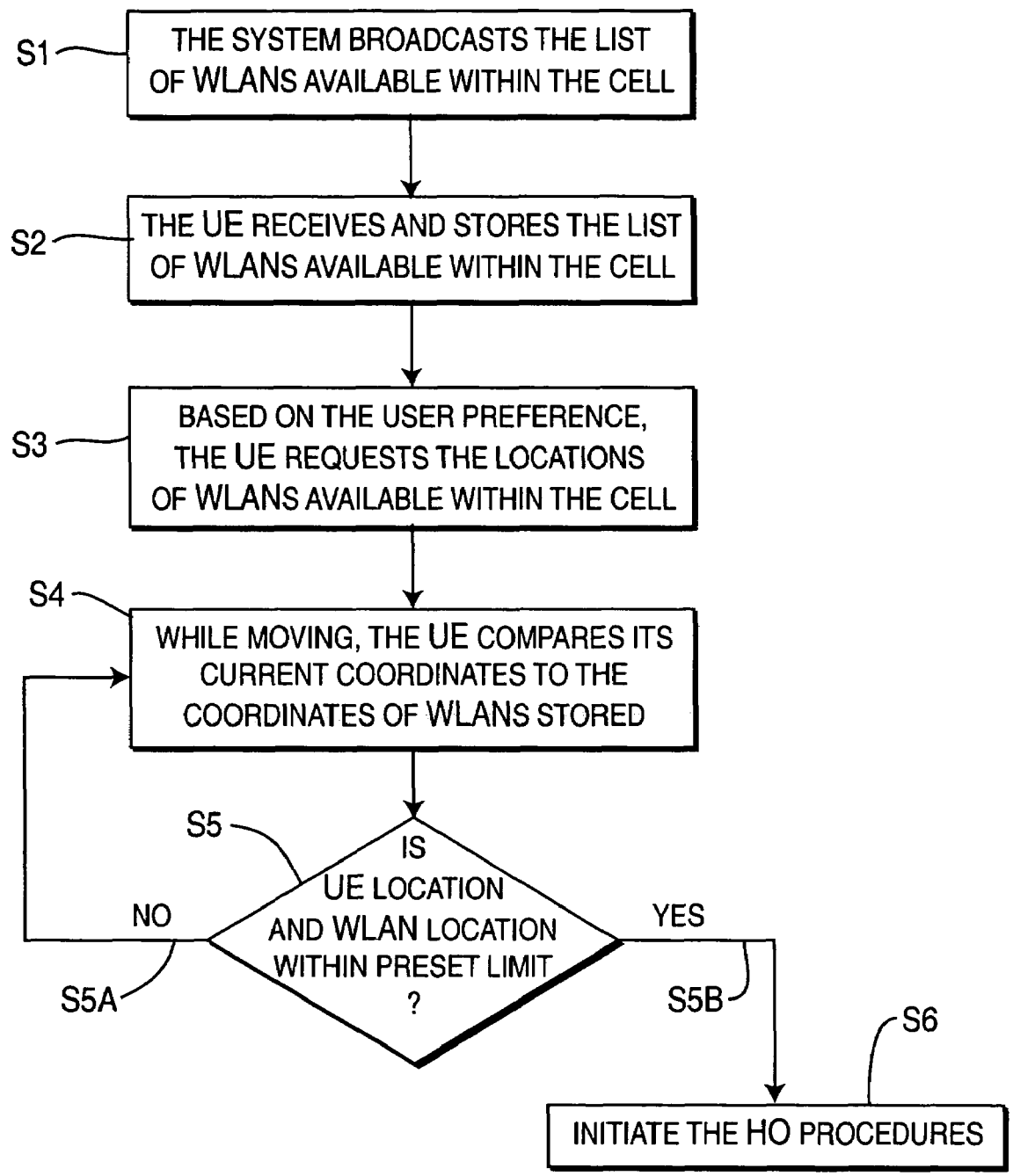
FIG. 1 is a flow diagram showing a UE initiated handoff from a UMTS to a WLAN.

A UE-initiated handoff from an UMTS12 to a WLAN14 is shown in the flow diagram of FIG. 1 wherein, at step S1, the system (UMTS) broadcasts a list of WLANs available within the cell in which the UE10 is located. The UE10 receives and stores a list of all WLANs available within that cell, at step S2. At step S3, the UE10 requests the locations of WLANs available within the cell, said request being based upon user preference. At step S4, the UE10, as it is moving, compares its current coordinates with the coordinates of those WLANs stored. At step S5, a determination is made as to whether the UE10 location and the WLAN14 location are within a preset limit. If not, the program jumps, at step S5A, back to step_S4. In the event that the UE10 and WLAN14 locations are within the preset limit, the program jumps, at step S5B, to step S6 whereupon the handoff (HO) procedure is initiated.

Figure 2:
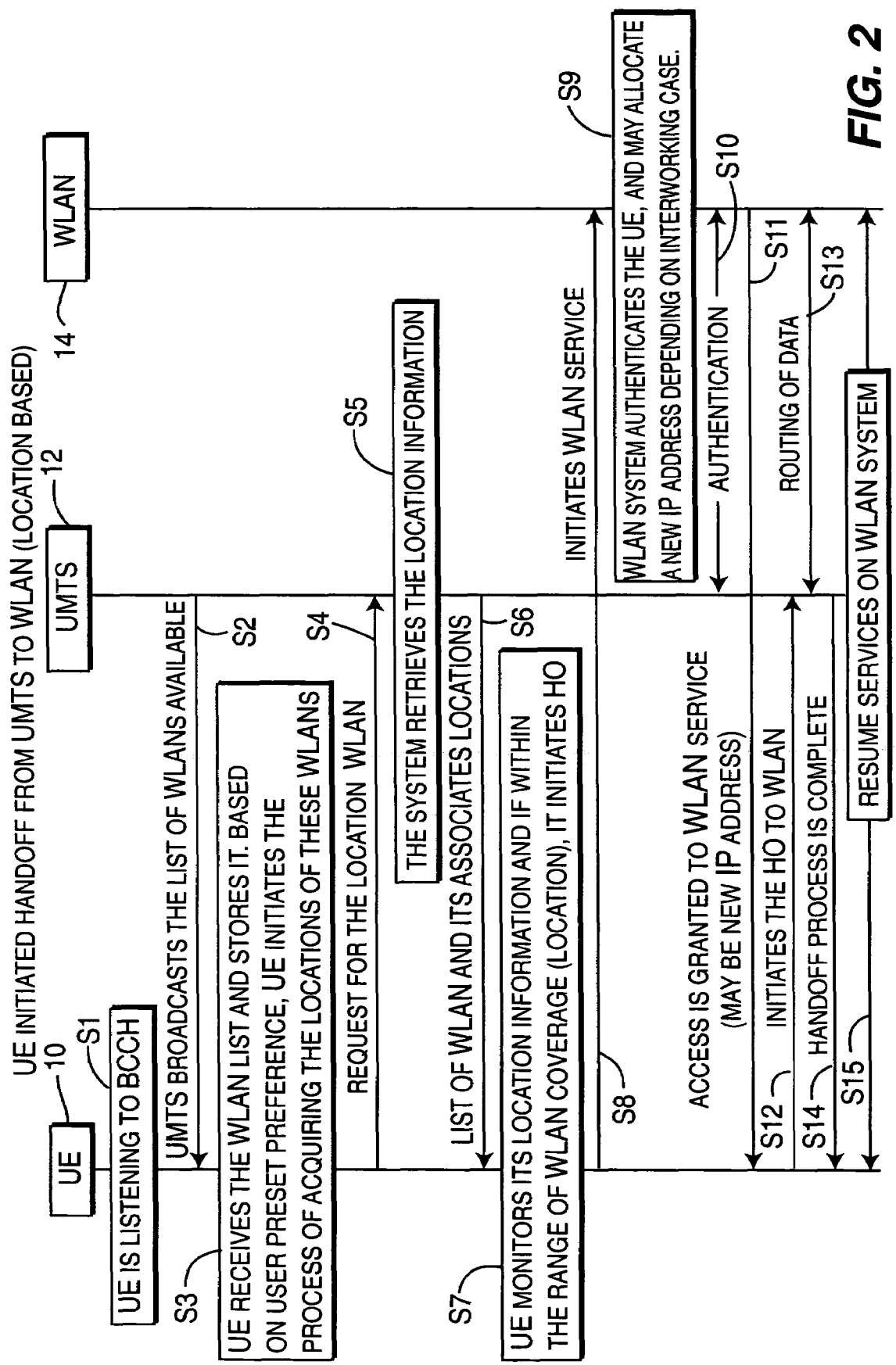
FIG. 2 is a flow diagram showing a UE initiated handoff from a UMTS to a WLAN which is location based.

FIG. 2 shows a more detailed UE—initiated handoff technique which is location based wherein the procedural steps take place between UE 10, UMTS 12 and WLAN 14.

At step S1, UE 10 listens to the broadcast control channel (BCCH). UMTS 12 broadcasts a list of WLANs available, at step S2. At step S3, UE 10 receives and stores the WLAN list and, based upon user preset preference, UE 10 initiates acquisition of the locations of the preferred WLANs and, at step S4, requests that UMTS 12 provide the locations of the preferred WLANs. At step S5, UMTS 12 retrieves the location information and provides UE 10 with a list of the WLANs and its associates locations, at step S6.

At step S7, UE 10 monitors the location information and initiates a handoff (HO) when UE 10 is in the range of the WLAN coverage, UE 10 initiating WLAN service to WLAN 14, at step S8.

WLAN 14, at step S9 authenticates the UE 10 through an interchange of information with UMTS 12, at step S10 and, depending upon the interworking case, at step S11, grants access to UE 10 and may provide a new internet protocol (IP) address depending on the interworking case.

UE 10, at step S12, initiates the handoff to the WLAN through UMTS 12, data being routed through a communication link between UMTS 12 and WLAN 14, at step S13.

UMTS 12, at step S14, provides a message to UE 10 that the handoff process is complete and, at step S15, services are resumed on the WLAN system 14 between UE 10 and WLAN 14.

Figure 3:
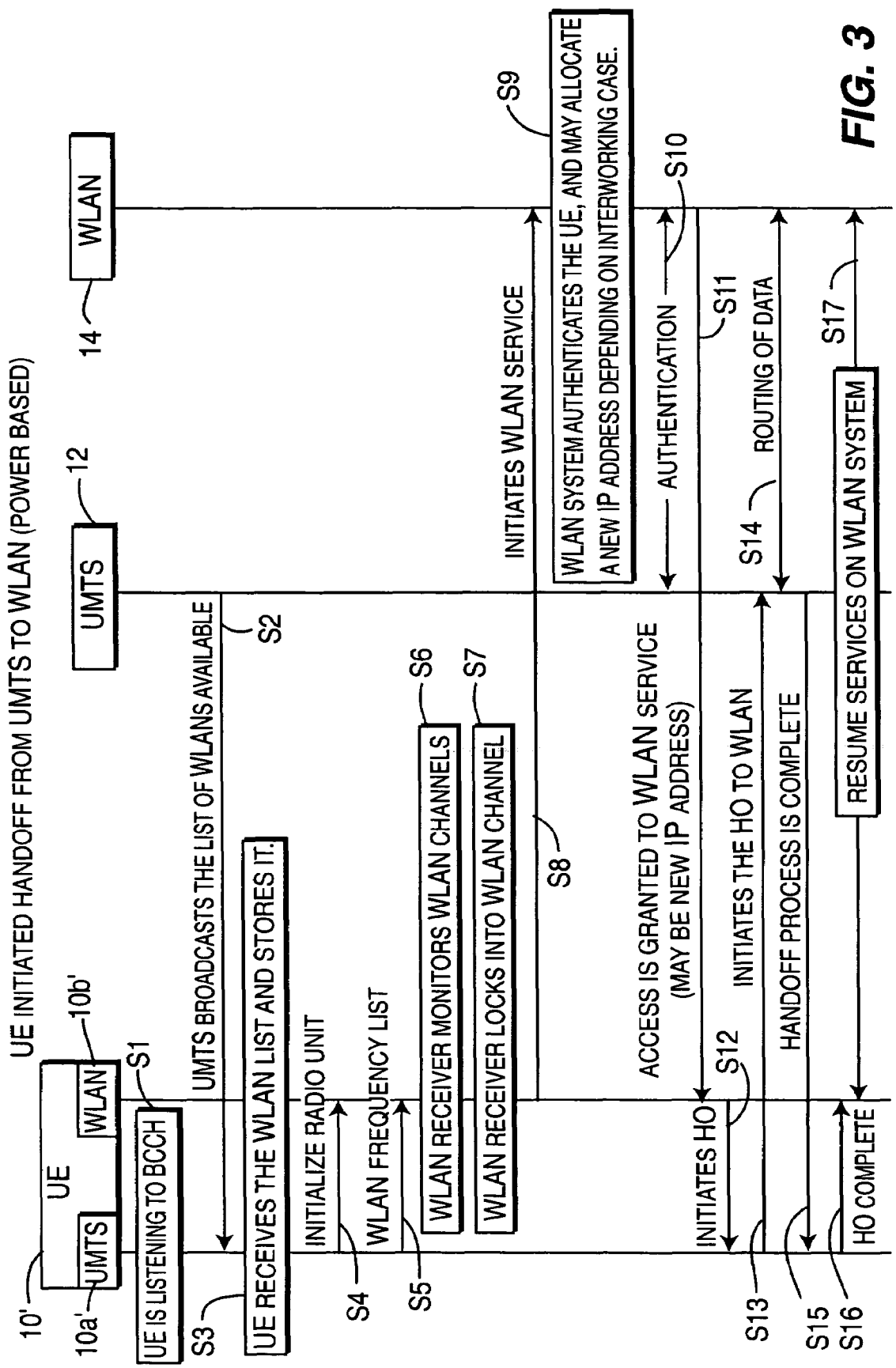
FIG. 3 is a flow diagram showing a UE initiated handoff from a UMTS to a WLAN which is power based.

FIG. 3 shows another technique for a UE initiated handoff from a UMTS 12 to a WLAN 14, UE 10' having communication capability with the UMTS 12 at 10*a'* and with the WLAN14, at 10*b'*.

At step S1, UE 10' listens to the broadcast channel (BCCH), UMTS 12, at step S2, broadcasting the list of available WLANs in the channel.

UE 10', at step S3, receives and stores the WLAN frequency list. UE 10' initializes radio unit 10*b'* at step S4 and, at step S5, transmits the WLAN frequency list to 10*b'*. The WLAN receiver 10*b'* monitors the WLAN channels, at step S6 and, at step S7, locks onto a WLAN channel and initiates WLAN service with WLAN 14, at step S8.

At step S9, WLAN 14 authenticates the UE 10' through an interchange of information with UMTS 12, at step S10. At step S11, WLAN 14 grants access to WLAN service and may allocate a new IP address depending upon the interworking case. The handoff is initiated between 10b' and 10a' at step S12 and 10a', at step S13, initiates the handoff to WLAN 14 through UMTS 12 which routes data to WLAN 14, at step S14.

UMTS 12, at step S15, alerts unit 10a' that the handoff process is complete and 10a', at step S16 alerts 10b' that the HO process is complete, whereupon services on the WLAN system are resumed between UE 10' and WLAN 14, at step S17.

Figure 4:
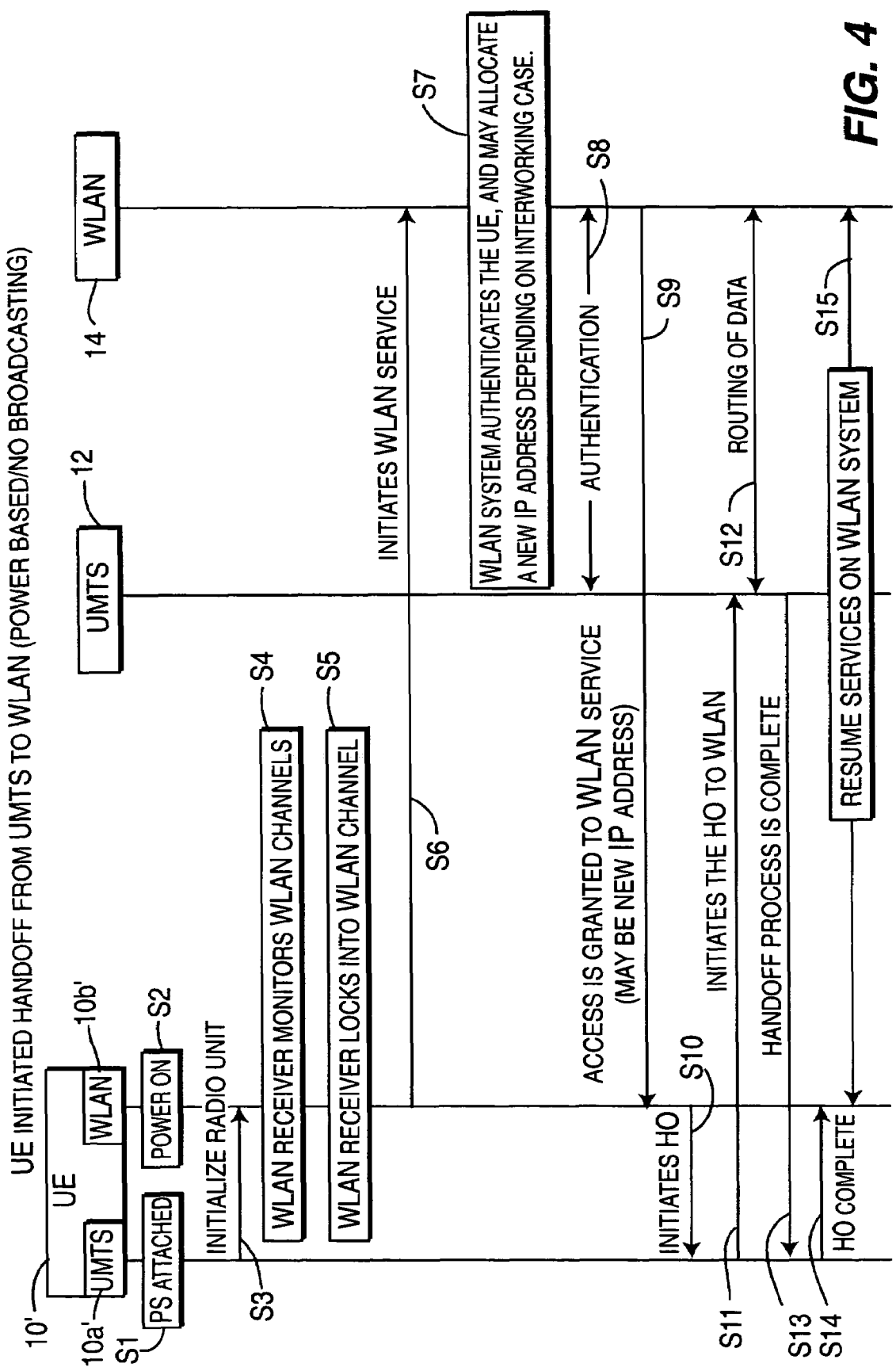
FIG. 4 is a flow diagram showing a UE initiated handoff from a UMTS to a WLAN, which is power based with no broadcasting.

FIG. 4 shows a UE-initiated handoff technique from UMTS 12 to WLAN 14 wherein UE 10' shown in FIG. 4 is similar in structure to the UE 10' shown in FIG. 3. In this embodiment, the handoff is power based and no broadcasting takes place.

The packet switched (PS) is attached, at step S1, from unit 10a' and the power at 10b' is turned on, at step S2. Unit 10a', at step S3, initializes the radio unit of 10b', whereupon 10b', at step S4, has its receiver monitor WLAN channels, locking onto a WLAN channel, at step S5, and initiating WLAN service with WLAN 14, at step S6.

WLAN 14 authenticates UE 10', at step S7, through an authentication procedure with UMTS 12, at step S8, and grants access to WLAN service at step S9 and may allocate a new IP address depending on the interworking case.

Unit 10b', at step S10, initiates the handoff (HO) with unit 10a' which, at step S11, initiates the handoff to WLAN 14 through UMTS 12, which is routed between UMTS 12 and WLAN 14, at step S12, and UMTS 12 alerts unit 10a' that the handoff process is complete, at step S13. Unit 10a', at step S14, alerts unit 10b' that the handoff is complete, whereupon services on the WLAN system are resumed between UE 10' and WLAN 14, at step S15.

Figure 5:
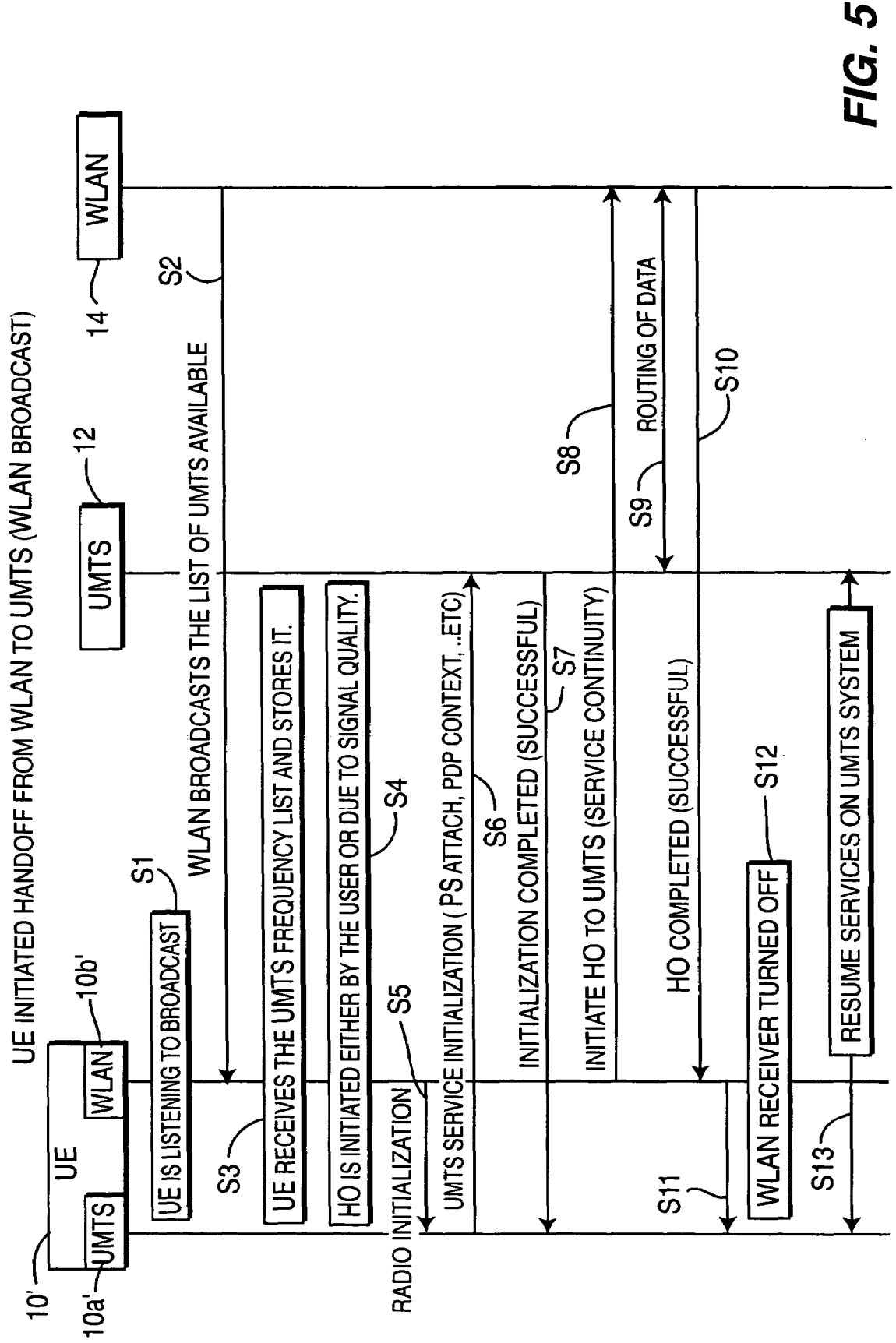
FIG. 5 is a flow diagram showing a UE initiated handoff from a WLAN to a UMTS employing a WLAN broadcast technique.

FIG. 5 shows another UE-initiated handoff technique utilizing a WLAN broadcast. UE 10' is similar to UE 10' shown in FIGS. 3 and 4.

The UE, through unit 10b', listens to the broadcast, at step S1, the broadcast of the list of UMTSs available being provided by WLAN 14, at step S2. UE 10' through unit 10b', receives and stores the UMTS frequency list, at step S3, and initiates handoff (HO) by way of a user initiation or, based on signal quality, at step S4, when the HO is initiated, the user selects a preset preference. When signal quality is used as a criteria, a measure of the signal quality is made and HO is initiated when the signal quality achieves a predetermined threshold.

Upon initiation of the handoff, 10b', at step S5, causes radio initialization at unit 10a'. Unit 10a', at step S6, starts UMTS service initialization, which includes package switched (PS) attached, packet data protocol (PDP) context and so forth. UMTS 12, at step S7, completes initialization advising unit 10a' that initialization is successful. At step S8, UE 10', through unit 10b', initiates the handoff to the UMTS (service continuity). At step S9, the routing of data occurs between WLAN 14 and UMTS 12, whereupon WLAN 14, at step S10, alerts unit 10b' that the handoff is completed (and it was successful). Unit 10b', at step S11, alerts 10a' that the handoff is completed and turns the WLAN receiver off, at step S12, whereupon services are resumed on the WLAN system between UMTS 12 and unit 10a', at step S13.

Figure 6:
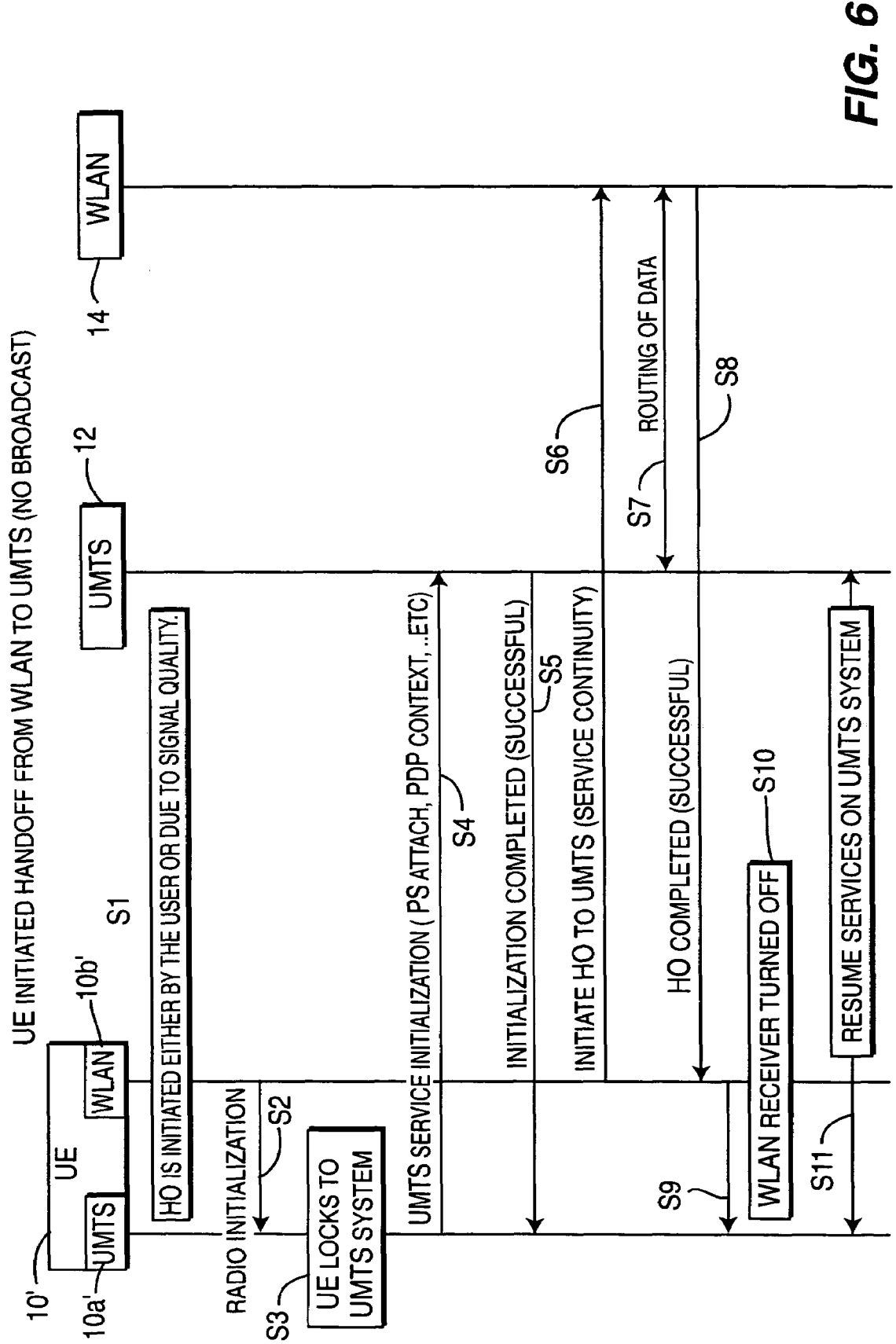
FIG. 6 is a flow diagram showing a UE initiated handoff from a WLAN to a UMTS where there is no broadcast.

FIG. 6 shows a UE—initiated handoff from a WLAN 14 to an UMTS 12. In this embodiment, UE 10', through unit 10b', initiates a handoff either by the user or automatically, due to signal quality, at step S1, the procedures herein being substantially identical to those described in connection with step S4 in the embodiment of FIG. 5.

Unit 10b', at step S2, causes radio initialization at 10a' which, at step S3, locks onto the UMTS system 12, and performs UMTS service and initialization, which step is substantially identical to step S6 shown in the embodiment of FIG. 5. Thereafter, steps S5 through S11 of FIG. 6 which are substantially identical to steps S7 through S13, respectively shown in FIG. 5, are performed, the difference between the embodiments of FIG. 5 and FIG. 6 being that there is no WLAN broadcast in the embodiment of FIG. 6.

Figure 7:
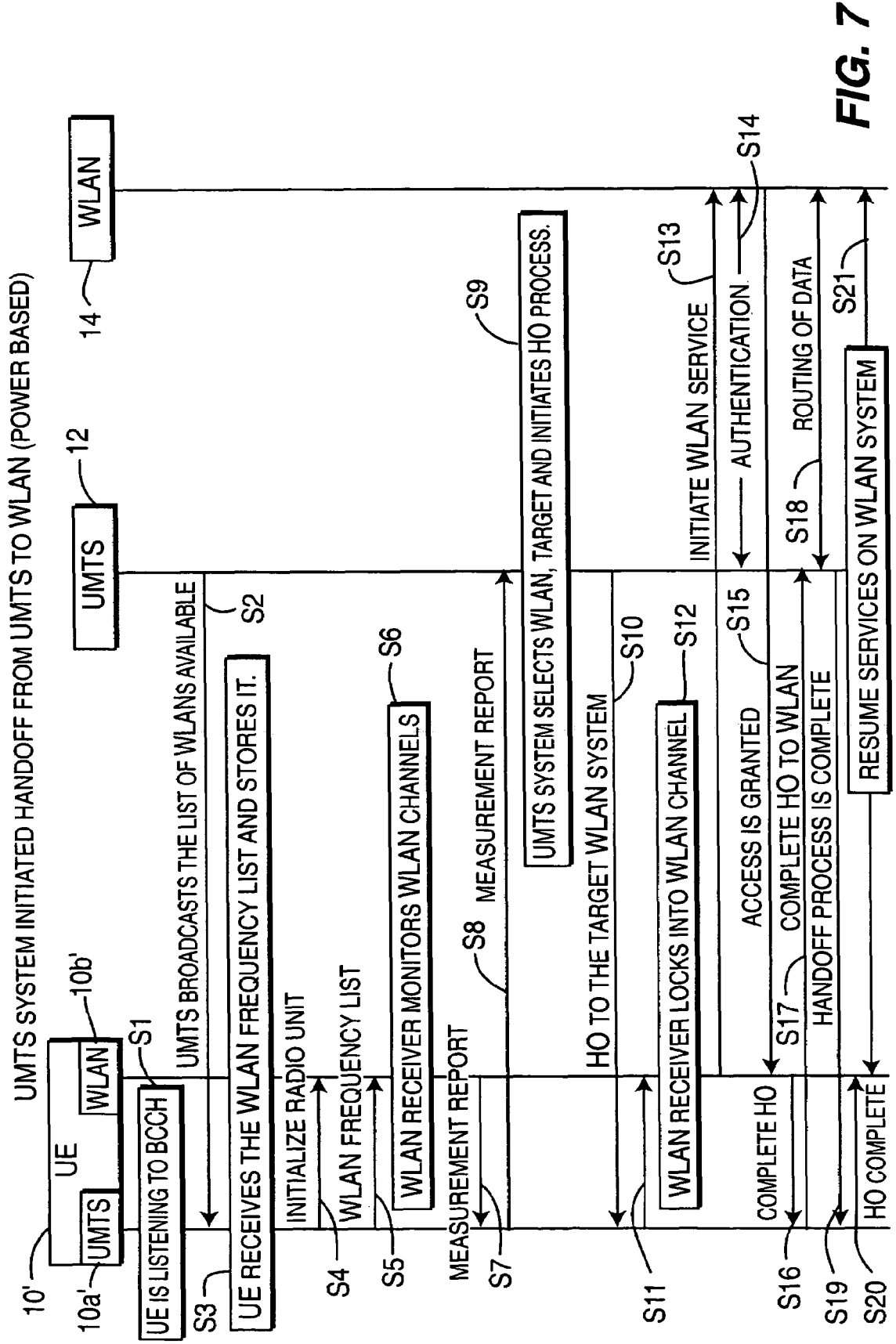
FIG. 7 is a flow diagram showing a UMTS system initiated handoff of a UE from a UMTS to a WLAN, which is power based.

FIG. 7 shows a UMTS system initiated handoff from a UMTS 12 to WLAN 14, the handoff technique being power based.

UE 10', through unit 10a' listens to the broadcast channel (BCCH) at step S1, UMTS 12 broadcasting a list of WLANs available, at step S2. UE 10', through unit 10a', receives and stores the WLAN frequency list, at step S3 and, at step S4, initializes the radio unit at 10b' providing the frequency list to unit 10b', at step S5. The WLAN receiver, at unit 10b', monitors the WLAN channels, at step S6, providing a measurement report to unit 10a' at step S7, which report is relayed from unit 10a' to UMTS 12, at step S8.

UMTS 12, at step S9, targets a specific WLAN and initiates the handoff process, providing the target WLAN system of the handoff process to unit 10a', at step S10.

UE 10', through unit 10a' alerts unit 10b' of the target WLAN system and the WLAN receiver of unit 10b' locks onto the WLAN channel of the target WLAN system, at step S12 and communicates with WLAN 14 to initiate the WLAN service, at step S13.

WLAN 14 authenticates UE 10' through communication with UMTS 12, at step S14 and, at step S15, grants access by communicating with unit 10b' which, at step S16, alerts unit 10a' that the handoff is complete. Unit 10a', at step S17, alerts UMTS 12 that the handoff to WLAN 14 is complete, whereupon UMTS 12 routes data to WLAN 14, at step S18. UMTS 12, at step S19, advises unit 10a' that the handoff process is complete, whereupon, unit 10a', at step S20, advises unit 10b' that the process is complete, whereupon service on the WLAN system between UE10' and 14 takes place, at step S21.

What is claimed is:

1. A method for automated handoff of a user equipment (UE) from a first system to a second system, said first system being one of a universal mobile telecommunication system (UMTS) and a wireless local area network (WLAN) and the second system being a remaining one of the UMTS and WLAN, comprising:

said first system:

sending a list of second systems available; and sending a location of those second systems available within a cell responsive to a request based on preferences of the user of the UE for enabling initiation of a handoff procedure by said UE when an available second system is within a preset limit.

2. A method for handoff of a user equipment (UE) from a first system to a second system wherein said first system is one of a universal mobile telecommunication system (UMTS) and a wireless local area network (WLAN) and said second system is a remaining one of the UMTS and WLAN, comprising:

said first system:

sending a list of second systems available;

said second system:
  authenticating the UE and granting access responsive to a request from said UE;
said UE initiating the handoff to the second system through communication with the first system;
said first system:
  routing data through said second system; and
  advising the UE when the handoff process is complete responsive to a handoff request from said UE; and
said second system:
  resuming services with said UE responsive to a message received from the first system that the handoff process is complete.

3. A dual-mode user equipment (UE) capable of communicating with a wireless local area network (WLAN) when in a WLAN mode and with a universal mobile telecommunication system (UMTS) when in a UMTS mode for handoff of the UE from a WLAN to a UMTS, comprising:
  said WLAN:
    sending a list of available UMTSs;
  said UMTS:
    acknowledging service initialization from said UE; and completing initialization;
  said WLAN:
    providing for routing of data with the UMTS responsive to a handoff request initiated by said UE and advising the UE that the handoff is complete; and
  said UMTS:
    resuming services with the UE operating in a UMTS mode.

4. A dual-mode user equipment (UE) capable of communicating with a wireless local area network (WLAN) when in a WLAN mode and with a universal mobile telecommunication system (UMTS) when in a UMTS mode for handoff of the UE from a WLAN to a UMTS, comprising:
  said UMTS:
    completing initialization with the UE responsive to a service initialization request from said UE;
  said WLAN:
    providing for routing of data with the UMTS; and responsive to a handoff request from said UE, advising the UE that the handoff is complete; and
  said UMTS:
    resuming services with the UE with the UE being in a UMTS mode.

5. A user equipment (UE) initiated handoff method for use by a dual mode UE capable of operating in a wireless local area network (WLAN) mode and a universal mobile telecommunication system (UMTS) mode for handoff of the UE from a UMTS to a WLAN, comprising:
  said UMTS:
    sending a list of available WLANs;
  said WLAN:
    initializing radio operation with the UE in the WLAN mode;
  said UMTS:
    selecting a WLAN target and initiating a handoff process responsive to a measurement report from the UE; and
    providing a target WLAN system to the UE;
  said WLAN:
    initiating WLAN service with said UE; and
    interfacing with said UMTS to provide authentication for the WLAN service, said WLAN granting access to the UE when in the WLAN mode; and
    resuming services with the UE.

6. A user equipment (UE) initiated system for automated handoff of the UE from a first system to a second system, said first system being one of a universal mobile telecommunication system (UMTS) and a wireless local area network (WLAN) and the second system being the remaining one of the UMTS and WLAN, comprising:
  said first system comprising:
    means for sending a list of the second systems available;
    means for providing a location of those second systems available within the cell based on requested preferences of the user of the UE; and
  said second system comprising:
    means for completing a handoff with the UE responsive to initiation of a handoff procedure by said UE.

7. UE initiated handoff system for handing off the UE from a first system to a second system wherein said first system is one of a UMTS and a WLAN and said system is a remaining one of the UMTS and WLAN, comprising:
  said first system comprising:
    means for sending a list of second systems available;
  said second system comprising:
    means for authenticating the UE and granting access responsive to a request from said UE;
  said first system further comprising:
    means for routing data through said second system and advising the UE when the handoff process is complete responsive to a request from said UE; and
  second system further comprising:
    means for resuming services with said UE responsive to the message received from the first system that the handoff process is complete.

8. A method for automated handoff of a UE from a first system to a second system, said first system being one of a UMTS and a WLAN and the second system being the remaining one of the UMTS and WLAN, comprising:
  said first system:
    sending a list of the second systems available responsive to a request from said UE; and
    providing the UE with a location of those second systems available within the cell based on preferences requested by the user of the UE; and
  said second system:
    completing a handoff procedure with said UE initiated by said UE when the UE is in a range of coverage of said second system.

9. A UE initiated handoff of a UE from a first system to a second system wherein said first system is one of a UMTS and a WLAN and said second system is a remaining one of the UMTS and WLAN, comprising:
  said first system:
    sending a list of second systems channels available requested by the UE;
  said second system:
    authenticating the UE and granting access responsive to a request from said UE;
  said first system:
    routing data through said second system and advising the UE when the handoff process is complete responsive to a request from said UE; and
  said second system resuming services with said UE responsive to the message received from the first system that the handoff process is complete.

* * * * *

UNITED STATES PATENT AND TRADEMARK OFFICE
CERTIFICATE OF CORRECTION

PATENT NO. : 7,120,460 B2 Page 1 of 1
APPLICATION NO. : 11/111569
DATED : October 10, 2006
INVENTOR(S) : Shaheen et al.

It is certified that error appears in the above-identified patent and that said Letters Patent is hereby corrected as shown below:

ON THE TITLE PAGE

At Item (56), page 2, right column, line 1, after "5/2004", delete "Kalliokuliu et al." and insert therefor --Kalliokulju et al.--.

IN THE SPECIFICATION

At column 2, line 13, after the word "from", delete "an" and insert therefor --a--.

At column 2, line 25, before "S4", delete "_".

At column 2, line 40, before the word "locations", delete "associates" and insert therefor --associated--.

At column 3, line 67, after the word "to", delete "an" and insert therefor --a--.

At column 4, line 43, before the word "takes", delete "14" and insert therefor --WLAN14--.

IN THE CLAIMS

At claim 9, column 6, line 53, after the word "second", delete "systems" and insert therefor --systems'--.

Signed and Sealed this

Twenty-fifth Day of September, 2007

JON W. DUDAS
*Director of the United States Patent and Trademark Office*